Nov. 1, 1938. R. L. BROWNLEE 2,135,384
FRICTION CLUTCH
Filed Sept. 2, 1937 2 Sheets-Sheet 1

Inventor:
Robert L. Brownlee
By: Stevens & Batchelor
Atty's.

Nov. 1, 1938.  R. L. BROWNLEE  2,135,384
FRICTION CLUTCH
Filed Sept. 2, 1937   2 Sheets-Sheet 2

Inventor:
Robert L. Brownlee
By: Stewart Batchelor
Attys.

Patented Nov. 1, 1938

2,135,384

UNITED STATES PATENT OFFICE 2,135,384

FRICTION CLUTCH

Robert L. Brownlee, Chicago, Ill.

Application September 2, 1937, Serial No. 162,189

5 Claims. (Cl. 192—65)

My invention relates to friction clutches as generally used in machinery, and more particularly to the type in which the driving and driven members are in the form of a pair of disks on a common shaft, and my main object is to provide a novel arrangement in the clutch zone which will secure a firm engagement of the clutch with a minimum of effort.

A further object of the invention is to provide a lining unit for the driving member of the clutch which is of an elastic type and serves to secure a smoother engagement of the clutch.

A still further object of the invention is to lend the driving member of the clutch a recessed formation whereby to retain the lining unit referred to without the need of fastening means.

Another object of the invention is to provide means in the driving member of the clutch for the wedging engagement of the aforesaid lining unit along a pair of convergent surfaces.

A further object of the invention is to construct the same along lines of ruggedness and extreme simplicity.

With the above objects in view, and any others which may suggest themselves from the description to follow, a better understanding of the invention may be had by reference to the accompanying drawings in which—

While friction clutches are generally of the disk type, it has been found that those of the cone type require much less effort to procure their firm engagement, owing to the fact that the conical surfaces assume a crowding or wedging action in process of engagement and therefore secure a better hold. However, cone clutches as generally designed have their disadvantages and operative difficulties, so that I have only adopted their principle in part, supplementing the same by use of the lining unit previously referred to between the clutch members.

Figures 1, 2:
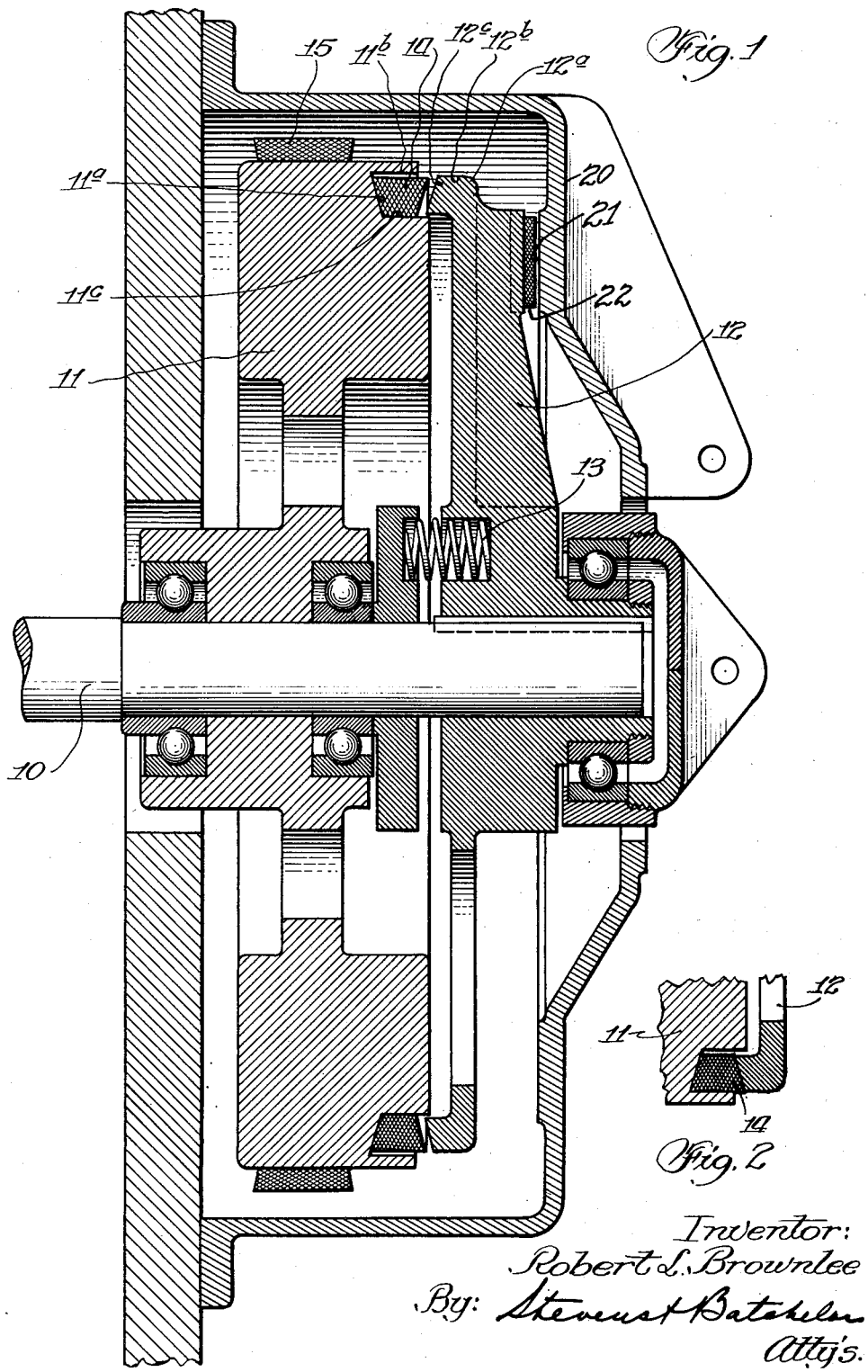
Fig. 1 is a vertical section of the preferred form of the novel clutch in the disengaged position.
Fig. 2 is a fragment of Fig. 1 with the clutch in the engaged position.

In accordance with the foregoing, specific reference to Figs. 1 and 2 in the drawings indicates the clutch shaft at 10, the driving member of the clutch at 11 and the driven member thereof at 12, it being understood that the driving member is freely rotatable on the shaft 10 while the driven member is slidably keyed thereon. Preferably, two or more springs 13 are employed to separate the driven member from the driving member when the clutch is out of engagement.

The driven member 12 is in the nature of a disk or spider whose peripheral portion 12a is extended in the direction of the member 11 with a circular flange 12b whose terminal face is inclined towards the member 11 as indicated at 12c.

The member 11 is also in the nature of a disk or spider and is formed with a circular channel or pocket 11a opposite the flange 12b and of a dimension to freely receive the same when the member 12 is advanced in the direction of the member 11.

While the outer wall 11b and the inner wall 11c of the channel 11a are concentric with the shaft 10, the back wall 11a is inclined in the direction of the clutch member 12, the face 12c of the latter and the back wall 11a preferably having the same degree of inclination.

The channel 11a is adapted to smoothly receive a lining member 14 of fabric or other elastic composition, and which is in the shape of a ring with a keystone cross-section. Commercially, this type of unit is known as an endless V-belt, and is available in leather, rubber or composition.

With the parts positioned as in Fig. 1, the clutch member 11 may be in constant rotation from a power source by way of a belt 15 or other mode of transmission. The clutch member is of course connected by means of the shaft 10 to the machine or other load which the clutch is intended to assume when engaged. To do this, any suitable means may be employed to advance the driven member 12 in the direction of the driving member 11. This action first secures the crowding or wedging engagement of a cone clutch by the intimacy of the flange surface 12c with the contiguous face of the lining member 14. Further pressure by the member 12 imparts a frictional engagement of the lining member with the back wall 11a of the member 11. Also, this pressure crowds the lining member in a radially outward direction, so that the outer periphery of the same assumes a frictional engagement with the outer wall 11b of the channel 11a. Finally, the pressure incurred by the lining member forces it with a wedging action between the converging faces 11a and 11b, so as to pack said lining member firmly not only against the surfaces 11a, 11b but into the corner formed by their union, thereby securing a tight and positive hold of the lining unit upon the member 11 without any shock or irregularity, owing to the fact that the lining unit is yieldable and absorbs all shock as the clutch takes hold. With the member 12 causing this hold, it must follow that such member becomes firmly joined in the zone of the engagement with the member 11 for purposes of rotation, so that both members act as one.

It will be appreciated that the cone clutch principle is but a part of the novel clutch mechanism. The cone clutch merely procures the easy engagement and early hold, but it is the action of the lining member 14 first in a rearward direction, then in a radial direction and finally in a wedging direction that secures the locking hold upon the member 11 in order that slippage may be eliminated as the load is assumed. Yet, the lining member is but a loop of V-belting which is readily insertible and removable, and cheaply replaceable. While the clutch may be of an open type, the drawings show the same enclosed by a housing 20. The housing 20 may include a surface 21 for engaging a suitable friction lining 22 carried by the driven member 12 as the latter is forced away from the driving member 11 by the springs 13 after the clutch is disengaged. This constitutes a well known form of brake for quickly stopping the rotation of shaft 10 after the release of the clutch and forms no particular part of my invention. It is apparent that the housing and clutch member 12 can be removed to permit access to the lining member 14 for removal and replacement.

Figure 3:
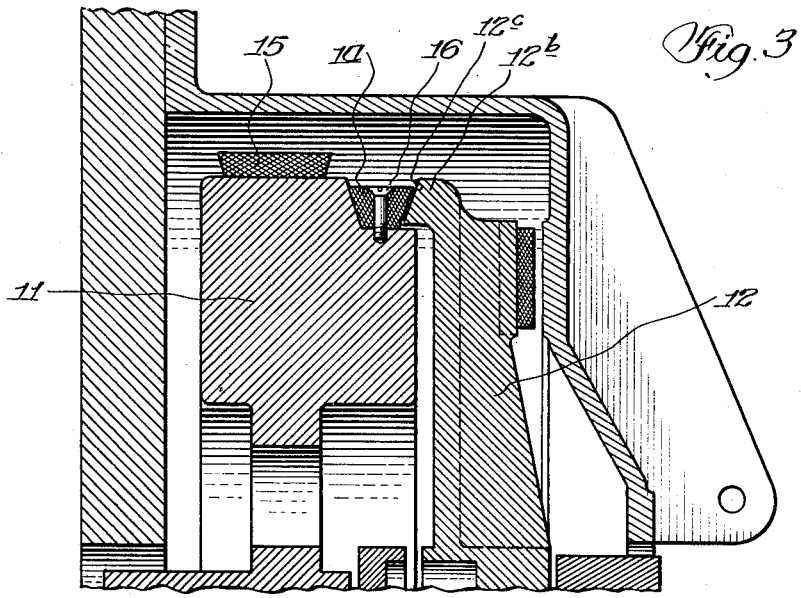
Fig. 3 is a section of a modification.

The modification of Fig. 3 shows an arrangement similar to the preferred one, except that the outer wall 11b of the drive member 11 is eliminated. Instead, the lining unit 14 is secured to the said member by a series of screws 16. While this construction renders the driving member simpler in form and easier to make, the lining unit is more involved by the addition of a plurality of fastening means. Also, the clutch is more adaptable to light machinery, where a strong engaging pressure is not necessary.

Figure 4:
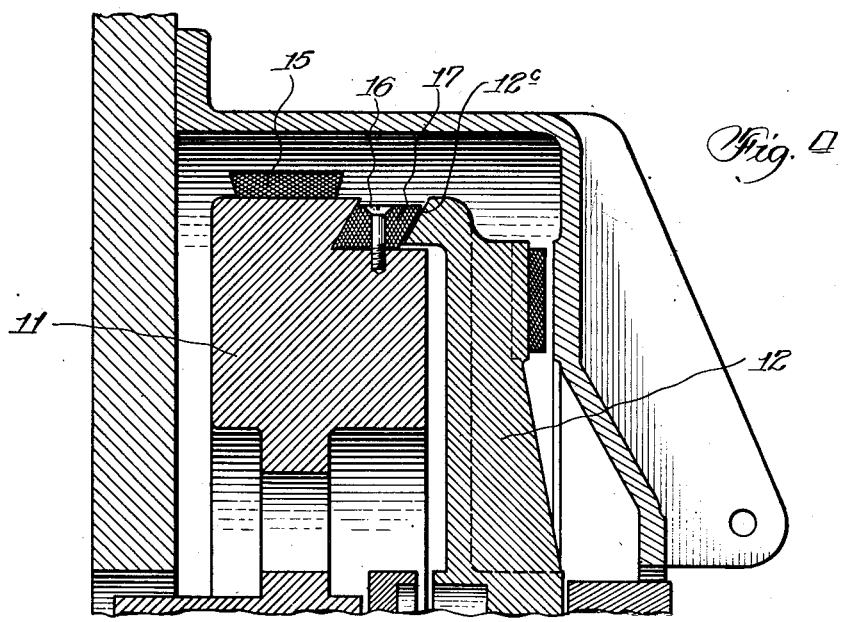
Fig. 4 is a section of a further modification.

In the modification of Fig. 4 the peripheral recess of the drive member 11 has a V-section, suitable in conjunction with the driven member 12 and a lining member 17 having the cross-section of a parallelogram. As in the modification of Fig. 3, this lining must be retained by screws or other fastening means, as the pressure by the member 12 would otherwise impart a rising or climbing tendency to the lining unit. While a pressure greater than for the form of Fig. 3 is possible with the form of Fig. 4, it is evident that the lining unit must be specially made, owing to its unusual form, and therefore renders the clutch more expensive to produce and maintain.

It is apparent from an understanding of the novel clutch and its modifications that the principle of the cone clutch has been combined with a lining unit carried by the driving member, and that such unit is not merely an interposed yieldable or compressible element but is of a form which offers inclined engaging surfaces both on the front and back sides of the lining member, enabling a packing, crowding and wedging action to occur in each zone. Considering that the clutch proper occupies only a small space along the rim of the running gear, the novel clutch becomes a mechanism of high structural and operative efficiency. Further, the operative part of the clutch is farthest from the center, requiring much less effort for purposes of engagement for this reason and giving the lining member a high surface speed for cooling, particularly along surfaces which are exposed or are adjacent to spaces or fissures where air can enter as the driving member rotates. Further, the clutch is constructed with its inclined surfaces and yielding lining unit for the gradual and smooth application of its pressure, whereby to eliminate shock, chattering, irregularity of engagement and undue wear, the lining unit expanding back to its original size when the pressure is released. Further, the lining unit in the preferred form is freely disposed in its channel, so that it readily adapts itself at all points to the engaging surfaces without being retained or withheld at any point, and is consequently self-adjusting. Further, because of its floating disposal and elastic nature, the lining unit quickly responds to the release of pressure and the rotation of the driving member to become dislodged from a packed of wedged position and assume its normal free and fullsized condition. Finally, it is apparent that the values in the novel clutch enable it to be used with equal efficiency as a brake which is simple, self-adjusting and quickly serviced.

I claim:—

1. A friction clutch comprising a rotary driving member with an open annular recess in an end face, said recess having inner, outer and rear walls, a driven member spaced from said frontal face and movable towards the same, a ring-shaped lining unit seated in said recess and supported by the inner wall thereof, and a portion of the driven member formed to engage said lining member on said movement of the driven member to move the same into engagement with at lease two walls of said recess to procure the clutching action.

2. A friction clutch comprising a rotary driving member with an open annular recess in one end face, said recess having inner, outer and back walls, a driven member spaced from said end face and movable towards the same, a ring-shaped lining unit seated in said recess, a portion of said driven member being formed to engage said lining member upon said movement of said driven member to procure the clutching action, the inner and outer walls of said recess being concentric and the back wall being rearwardly inclined from the inner wall thereof, and the lining unit and driven member being formed to cause a wedging action of the lining unit into the angle between said outer and back walls when the clutching action occurs.

3. A friction clutch comprising a rotary driving member with an open annular recess in one end face, said recess having inner, outer and back walls, a driven member spaced from said end face and movable towards the same, a ring-shaped lining unit seated in said recess, a portion of said driven member being formed to engage said lining member upon said movement of said driven member to procure the clutching action, the outer and inner walls of said recess being concentric and the back wall thereof being rearwardly inclined from said inner wall, said lining unit being of keystone cross-section to seat with its rear face upon said back wall, and said portion of the driven member being inclined to conform with the frontal face of the lining unit.

4. The structure of claim 1, said lining unit having its side faces inclined and having relatively wide and parallel inner and outer surfaces.

5. The structure of claim 1, said inner and outer walls of said recess being concentric, said rear wall of said recess being rearwardly inclined from the inner wall thereof, said lining unit having relatively wide inner and outer surfaces, said surfaces being parallel to said inner and outer walls of said recess, at least the rear face of said lining unit being inclined to conform substantially to said incline of said rear wall of said recess, whereby the engagement of said driven member with said lining unit causes the same to be wedged into the angle formed by the junction of said rear and outer walls of said recess.

ROBERT L. BROWNLEE.